(12) United States Patent
Cheon (10) Patent No.: US 11,127,989 B2
(45) Date of Patent: Sep. 21, 2021

(54) BATTERY PACK (71) Applicant: SAMSUNG SDI CO., LTD., Yongin-si (KR)

(72) Inventor: Moonsoo Cheon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 302 days.

(21) Appl. No.: 16/093,600

(22) PCT Filed: Apr. 18, 2017

(86) PCT No.: PCT/KR2017/004125
§ 371 (c)(1),
(2) Date: Oct. 12, 2018

(87) PCT Pub. No.: WO2017/188642
PCT Pub. Date: Nov. 2, 2017

(65) Prior Publication Data
US 2019/0123393 A1 Apr. 25, 2019

(30) Foreign Application Priority Data

Apr. 26, 2016 (KR) .......................... 10-2016-0051109

(51) Int. Cl.
H01M 10/42 (2006.01)
H01M 50/20 (2021.01)
(Continued)

(52) U.S. Cl.
CPC ......... *H01M 10/425* (2013.01); *H01M 50/20* (2021.01); *H01M 50/50* (2021.01);
(Continued)

(58) Field of Classification Search
CPC ...... H01M 2/10; H01M 2/1016; H01M 2/105; H01M 2/1072; H01M 2/1083; H01M 2/20;
(Continued)

(56) References Cited

U.S. PATENT DOCUMENTS 3,976,348 A * 8/1976 Simmons ............... H01R 11/00
439/268
4,030,804 A * 6/1977 Enomoto ............. H01R 13/115
439/884

(Continued)

FOREIGN PATENT DOCUMENTS

| CN | 2305791 Y | 1/1999 |
| CN | 1237280 A | 12/1999 |

(Continued)

OTHER PUBLICATIONS

Chinese Office Action, with English translation, dated Jan. 6, 2021, issued in corresponding Chinese Patent Application No. 201780026045.8 (15 pages).

(Continued)

*Primary Examiner* — Golam Mowla
(74) *Attorney, Agent, or Firm* — Lewis Roca Rothgerber Christie LLP (57) ABSTRACT Provided is a battery pack. The battery pack includes a battery cell, a circuit unit, a lock member, and a lead member, the lock member and the lead member being assembled with each other to form a signal transfer path between the battery cell and the circuit unit, wherein the lock member includes a stopper protruding upward in an up-down direction that is different from an assembling direction of the lead member, and a groove portion depressed downward, the stopper and the groove portion provided at different locations from each other along the assembling direction of the lead member, and the lead member includes an (Continued)

end portion contacting the stopper and a pressing portion contacting the groove portion. According to the present disclosure, the battery pack is capable of reducing electrical resistance between a plurality of battery cells and a circuit unit by improving a component assembling structure for forming an electrical path between the plurality of battery cells and the circuit unit, and forming uniform resistance with respect to a plurality of electrical paths and reducing a measuring error by preventing components from floating.

18 Claims, 7 Drawing Sheets

(51) Int. Cl.
*H01M 50/50* (2021.01)
*H01M 50/531* (2021.01)
*H02J 7/00* (2006.01)

(52) U.S. Cl.
CPC ......... *H01M 50/531* (2021.01); *H02J 7/0014* (2013.01); *H01M 2010/4271* (2013.01); *H01M 2010/4278* (2013.01)

(58) Field of Classification Search
CPC ...... H01M 2/26; H01M 10/42; H01M 10/425; H01M 50/50; H01M 50/531; H01M 50/20; H01M 2010/4271; H01M 2010/4278
See application file for complete search history.

(56) References Cited

U.S. PATENT DOCUMENTS

| | | | |
|---|---|---|---|
| 4,699,444 A | 10/1987 | Isohata | |
| 4,781,628 A * | 11/1988 | Detter | H01R 13/432 |
| | | | 439/748 |
| 5,266,056 A * | 11/1993 | Baderschneider | H01R 13/432 |
| | | | 439/745 |
| 5,695,368 A * | 12/1997 | Joly | H01R 13/432 |
| | | | 439/748 |
| 6,183,312 B1 | 2/2001 | Yamamoto | |
| 6,679,738 B2 * | 1/2004 | Nimura | H01R 13/114 |
| | | | 439/752.5 |
| 8,421,412 B2 | 4/2013 | Kim | |
| 8,785,781 B2 | 7/2014 | Park | |
| 8,974,951 B2 | 3/2015 | Park et al. | |
| 9,159,968 B2 | 10/2015 | Park et al. | |
| 2013/0202919 A1 | 8/2013 | Hwang | |
| 2015/0064524 A1 | 3/2015 | Noh et al. | |

FOREIGN PATENT DOCUMENTS

| | | |
|---|---|---|
| CN | 2384326 Y | 6/2000 |
| CN | 2821907 Y | 9/2006 |
| CN | 201450354 U | 5/2010 |
| CN | 101944629 A | 1/2011 |
| CN | 203013818 U | 6/2013 |
| DE | 202005022111 U1 | 6/2014 |
| EP | 1841010 A2 | 10/2007 |
| EP | 1841010 A3 | 10/2007 |
| EP | 2439810 B1 | 1/2013 |
| GB | 1497164 A | 1/1978 |
| JP | 6-251820 A | 9/1994 |
| JP | 2000-223195 A | 8/2000 |
| JP | 2010-55819 A | 3/2010 |
| JP | 5583538 B2 | 9/2014 |
| JP | 2014-220168 A | 11/2014 |
| KR | 1986-0008627 A | 11/1986 |
| KR | 1999-007634 U | 2/1999 |
| KR | 10-2008-0013040 A | 2/2008 |
| KR | 10-2011-0016166 A | 2/2011 |
| KR | 10-2011-0139083 A | 12/2011 |
| KR | 10-2015-0026112 A | 3/2015 |

OTHER PUBLICATIONS

International Search Report of corresponding PCT/KR2017/004125, dated Jul. 24, 2017, 5 pages.
Written Opinion of the International Searching Authority of corresponding PCT/KR2017/004125, dated Jul. 24, 2017, 5 pages.

* cited by examiner

BATTERY PACK

CROSS-REFERENCE TO RELATED APPLICATION(S)

This application is a U.S. National Phase Patent Application of International Application Number PCT/KR2017/004125, filed on Apr. 18, 2017, which claims priority of Korean Patent Application Number 10-2016-0051109, filed on Apr. 26, 2016, the entire contents of all of which are incorporated herein by reference.

TECHNICAL FIELD

The present disclosure relates to a battery pack.

BACKGROUND ART

In general, a secondary battery may be charged and discharged, unlike a primary battery that cannot be recharged. A secondary battery is used as an energy source in mobile devices, electric vehicles, hybrid vehicles, electric bicycles, and uninterruptible power supplies, and may be used in the form of a single battery or a battery pack in which a plurality of batteries are electrically connected as a single unit, depending on the kind of external device to which the secondary battery is applied.

A small-sized mobile device such as a mobile phone is operable with the output and capacity of a single battery, but in electronic vehicles or hybrid vehicles which consume a lot of power when driven for a long time with a high amount of power, a pack type including a plurality of batteries is preferably used due to the output and capacity issues. In addition, an output voltage or an output current may increase according to the number of batteries included in the pack.

DESCRIPTION OF EMBODIMENTS

Technical Problem

Provided is a battery pack capable of reducing electrical resistance between a plurality of battery cells and a circuit unit and preventing components from moving according to an assembling strength by improving a component assembling structure for forming an electrical path between the plurality of battery cells and the circuit unit, in order to provide a plurality of electrical paths with uniform resistance and to reduce measurement errors.

Solution to Problem

According to an aspect of the present disclosure, there is provided a battery pack including a battery cell, a circuit unit, a lock member, and a lead member, the lock member and the lead member being assembled with each other to form a signal transfer path between the battery cell and the circuit unit, wherein the lock member includes a stopper protruding upward in an up-down direction that is different from an assembling direction of the lead member, and a groove portion depressed downward, the stopper and the groove portion being provided at different locations from each other along the assembling direction of the lead member, and the lead member includes an end portion contacting the stopper and a pressing portion contacting the groove portion.

Advantageous Effects of Disclosure

According to the present disclosure, a battery pack is capable of reducing electrical resistance between a plurality of battery cells and a circuit unit by improving a component assembling structure for forming an electrical path between the plurality of battery cells and the circuit unit, and forming a uniform resistance with respect to a plurality of electrical paths and reducing a measuring error by preventing components from floating.

BEST MODE

A battery pack includes a battery cell, a circuit unit, a lock member, and a lead member, the lock member and the lead member being assembled with each other to form a signal transfer path between the battery cell and the circuit unit, wherein the lock member includes a stopper protruding upward in an up-down direction that is different from an assembling direction of the lead member, and a groove portion depressed downward, the stopper and the groove portion being provided at different locations from each other along the assembling direction of the lead member, and the lead member includes an end portion contacting the stopper and a pressing portion contacting the groove portion.

MODE OF DISCLOSURE

Hereinafter, a battery pack according to one or more embodiments will be described below with reference to accompanying drawings.

Figure 1:
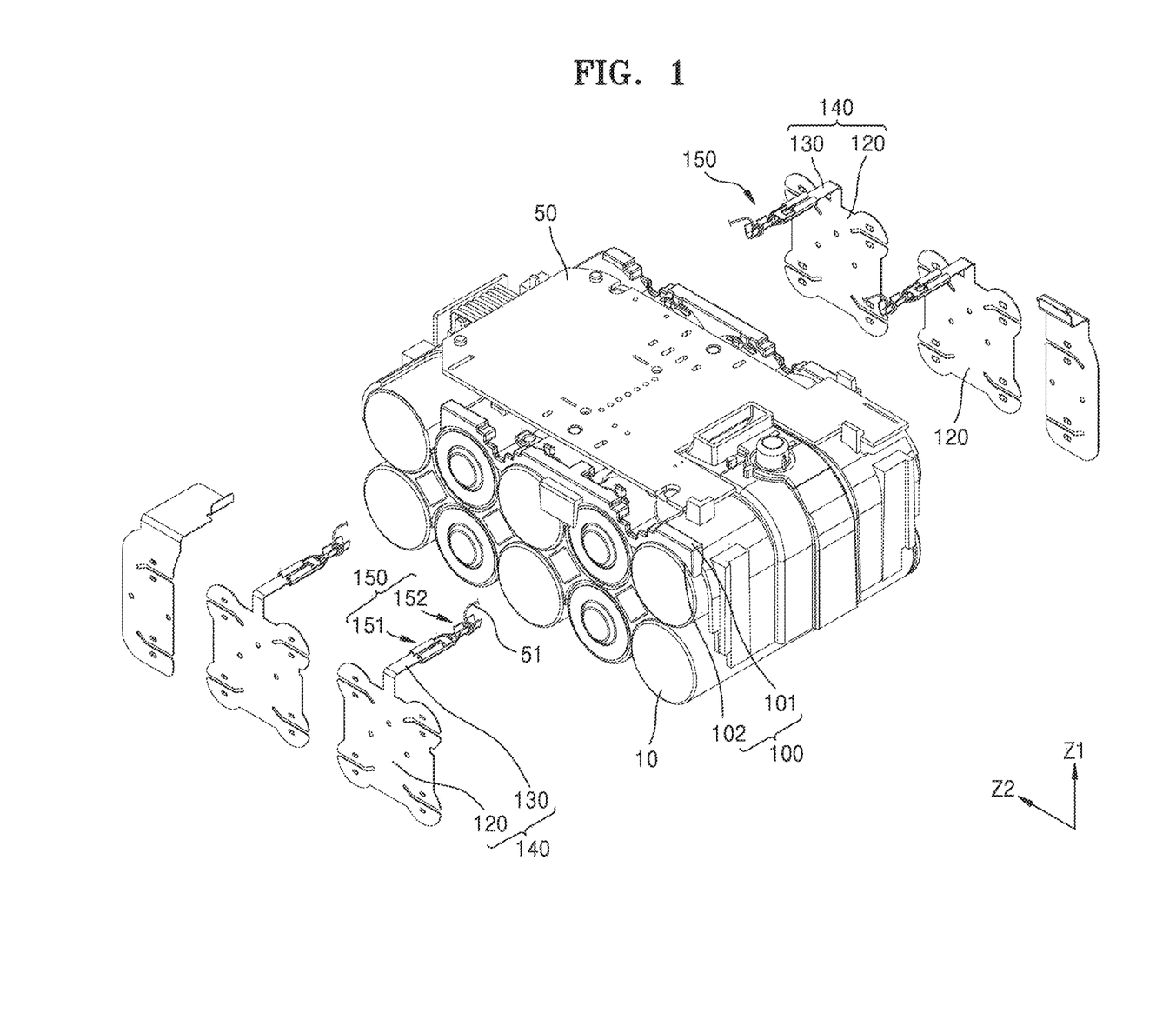
FIG. 1 is an exploded perspective view of a battery pack according to an embodiment.

FIG. 1 is an exploded perspective view of a battery pack according to an embodiment.

Referring to FIG. 1, the battery pack may include a plurality of battery cells 10, a cell holder 100 for accommodating the battery cells 10, and a circuit unit 50 for controlling charging and discharging operations of the battery cells 10.

Each of the battery cells 10 may have different electrodes at opposite ends thereof in a length direction, and may be formed as a cylinder. The plurality of battery cells 10 may include two or more battery cells 10. The plurality of battery cells 10 may be electrically connected to one another in a serial manner, a parallel manner, or a combined manner. The plurality of battery cells 10 may be electrically connected to one another via a lead member 140, in more detail, a connector 120 of the lead member 140, for example, may be connected in parallel via the connector 120 of the lead member 140 that electrically connects the same polarities of neighboring battery cells 10 or may be connected in series via the connector 120 of the lead member 140 that electrically connects opposite polarities of the neighboring battery cells 10.

For example, the connector 120 of the lead member 140 may electrically connect for battery cells 10 to one another, that is, the connector 120 of the lead member 140 may connect the neighboring battery cells 10 in a first direction (Z1 direction) in parallel while connecting the neighboring battery cells 10 in a second direction (Z2 direction) in series. In more detail, the connector 120 of the lead member 140 may connect the battery cells 10 in parallel by connecting the same polarities of the corresponding battery cells 10 that form a pair in the first direction (Z1 direction), and may connect the battery cells 10 in series by connecting the opposite polarities of the corresponding battery cells 10 that form a pair in the second direction (Z2 direction).

By connecting the battery cells 10 in parallel in the first direction (Z1 direction) and connecting the battery cells 10 in series in the second direction (Z2 direction), a combined connection of the parallel-serial connections may be obtained. Accordingly, an output capacity of the battery pack may be optimized to be high capacity and high output. Also, by forming a parallel connection in the first direction (Z1 direction) and forming a serial connection in the second direction (Z2 direction) by using the connector 120 of the lead member 140, the number of lead members 140 for connecting the neighboring battery cells 10 may be reduced.

The battery cells 10 may be accommodated in the cell holder 100. The cell holder 100 may provide an accommodation space matching with the battery cells 10. For example, the cell holder 100 may include a plurality of cylindrical accommodation spaces that are arranged in first and second directions Z1 and Z2. The cell holder 100 has an internal surface 102 facing the battery cells 10 to surround the battery cells 10, and an external surface 101 for supporting the circuit unit 50.

The cell holder 100 may have various shapes, provided that the accommodation space for the battery cells 10 may be generated. For example, the cell holder 100 may be formed as one body or may be formed by combining different members.

The battery pack may further include the circuit unit 50 for controlling charging/discharging operations of the battery cells 10. The circuit unit 50 obtains state information of the battery cells 10, and may control the charging/discharging operations of the battery cells 10 based on the state information. For example, the circuit unit 50 obtains state information such as a temperature and a voltage of each battery cell 10, and senses wrong operations such as overcharging, over-discharging, and over-heating based on the state information to take protective measures such as suspension of the charging/discharging operations of the battery cell 10. The circuit unit 50 may be arranged on the external surface 101 of the cell holder 100. The circuit unit 50 may obtain the state information from the battery cell 10, and may be connected to the battery cell 10 via the lead member 140.

The battery pack according to an embodiment may include the lead member 140 and a lock member 150 that are assembled with each other for forming a signal transfer path between the battery cells 10 and the circuit unit 50. With respect to the signal transfer path between the battery cells 10 and the circuit unit 50, the battery cell 10 may be connected to the lock member 150 via the connector 120 and a lead portion 130 of the lead member 140, and the lock member 150 may be connected to the circuit unit 50 via a lead lock portion 151 and a wiring lock portion 152. The lead member 140 and the lock member 150 may electrically connect an electrode of the battery cell 10 and the circuit unit 50 that are connected respectively to the lead member 140 and the lock member 150 to each other, via the lead portion 130 and the lead lock portion 151 that are coupled to each other.

The lead member 140 is connected to the electrode of the battery cell 10 to transfer voltage information of the battery cell 10 to the circuit unit 50. For example, the connector 120 of the lead member 140 is connected to the electrode of the battery cell 10, and the lead portion 130 of the lead member 140 may be connected to the lock member 150.

The lock member 150 may form a signal transfer path between the lead member 140 and the circuit unit 50 or between the lead member 140 and a wiring 51. Here, the wiring 51 may input an electric signal, that is, voltage information of the battery cell 10, to the circuit unit 50. For example, the lock member 150 may be directly connected to the circuit unit 50 or may be connected to the wiring 51 that is connected to the circuit unit 50.

The lead member 140 may be connected to the circuit unit 50 via the lock member 150. Here, the lock member 150 may include the lead lock portion 151 at a side of the lead member 140, and the wiring lock portion 152 at a side of the circuit unit 50.

Figure 2:
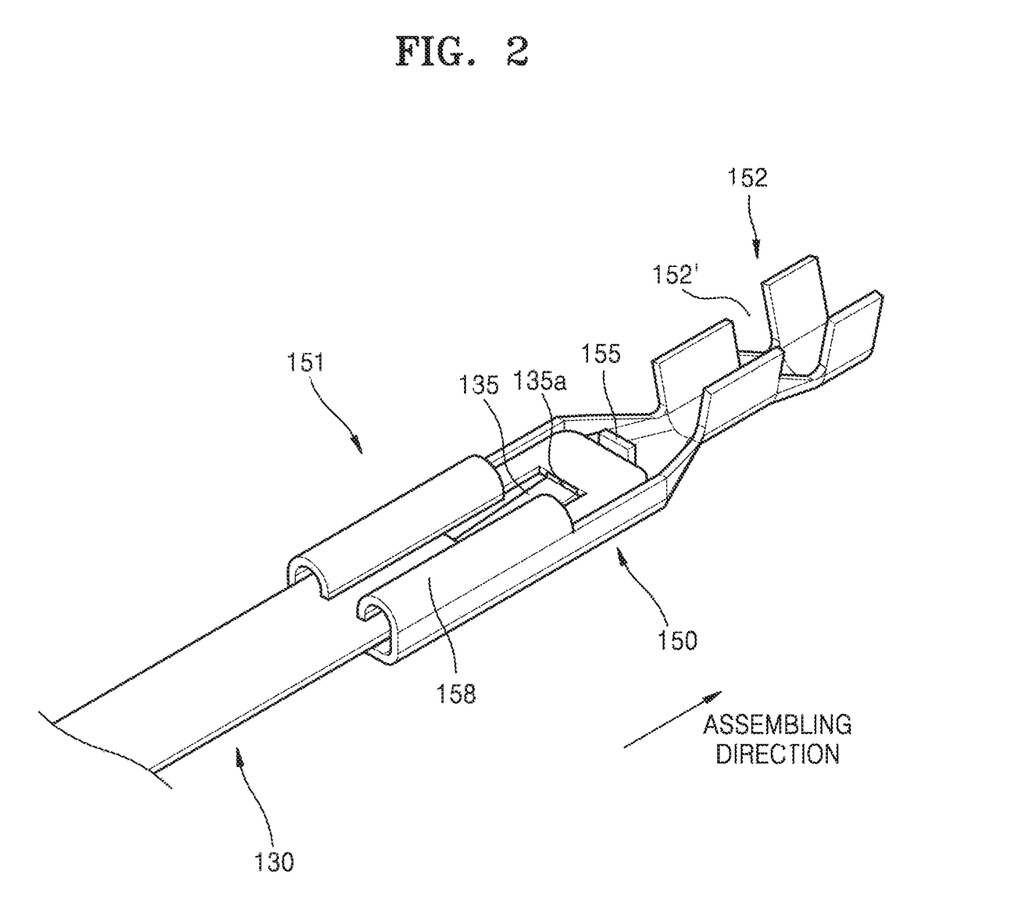
FIG. 2 is a perspective view showing assembly of a lead portion with a lock member.
Figure 3:
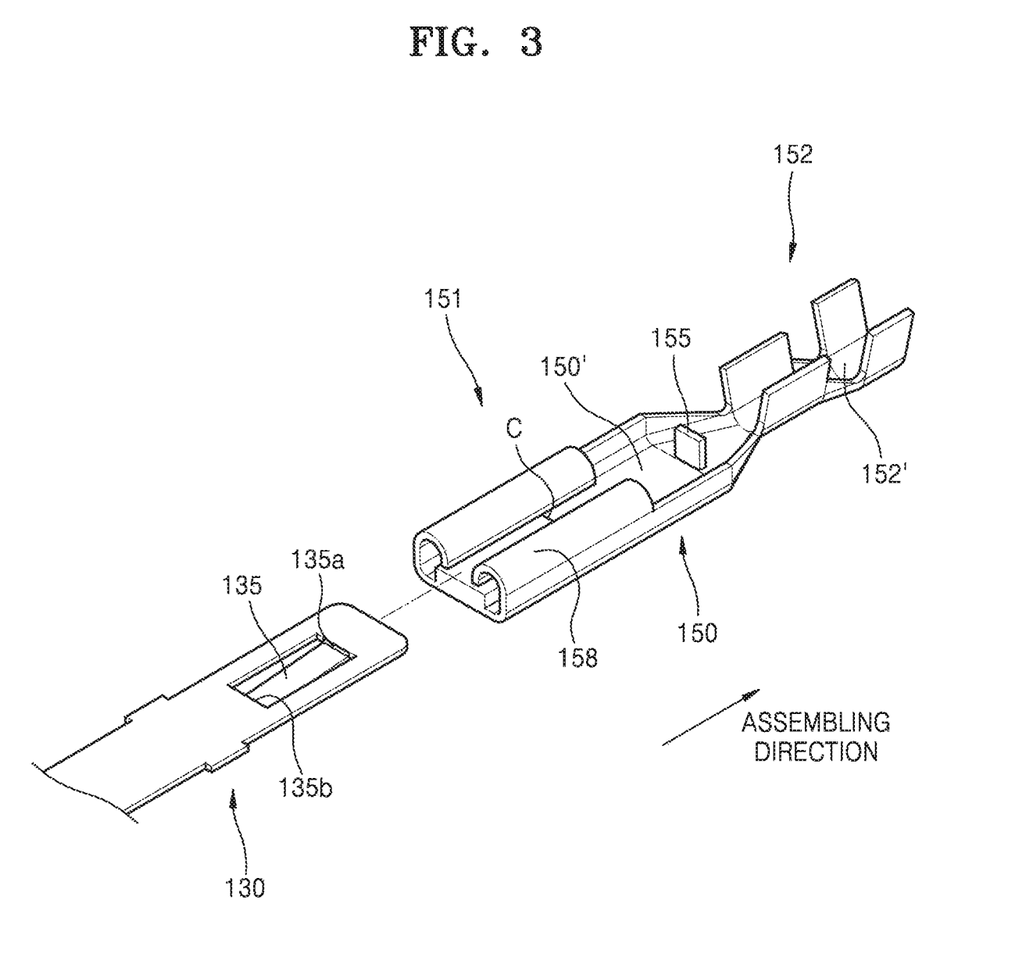
FIG. 3 is a perspective view showing the lead portion and the lock member of FIG. 2 when separated, for describing assembly of the lead portion with the lock member.
Figure 4:
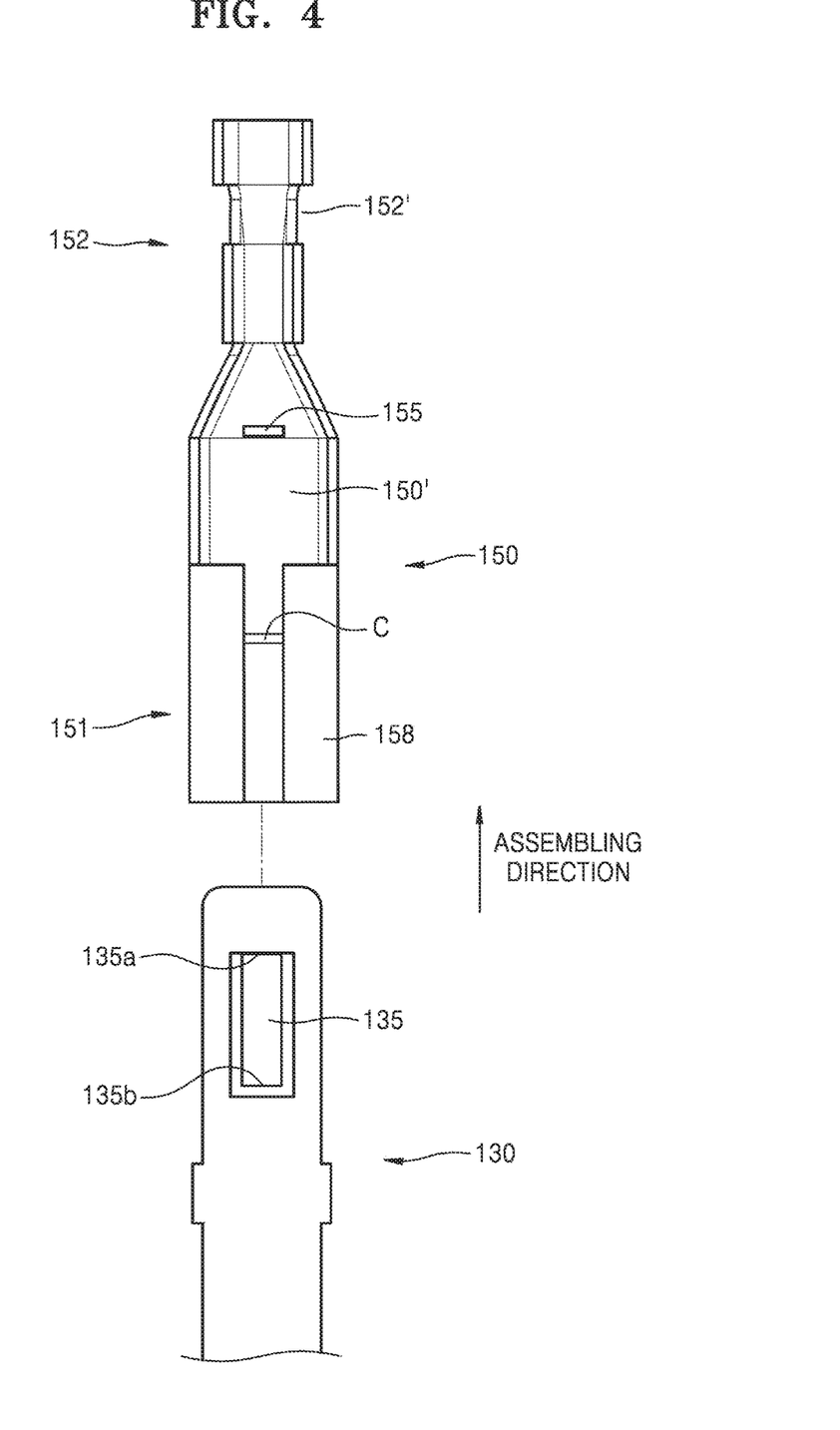
FIG. 4 is a plan view showing the lead portion and the lock member of FIG. 2 when separated, for describing assembly of the lead portion with the lock member.
Figure 5:
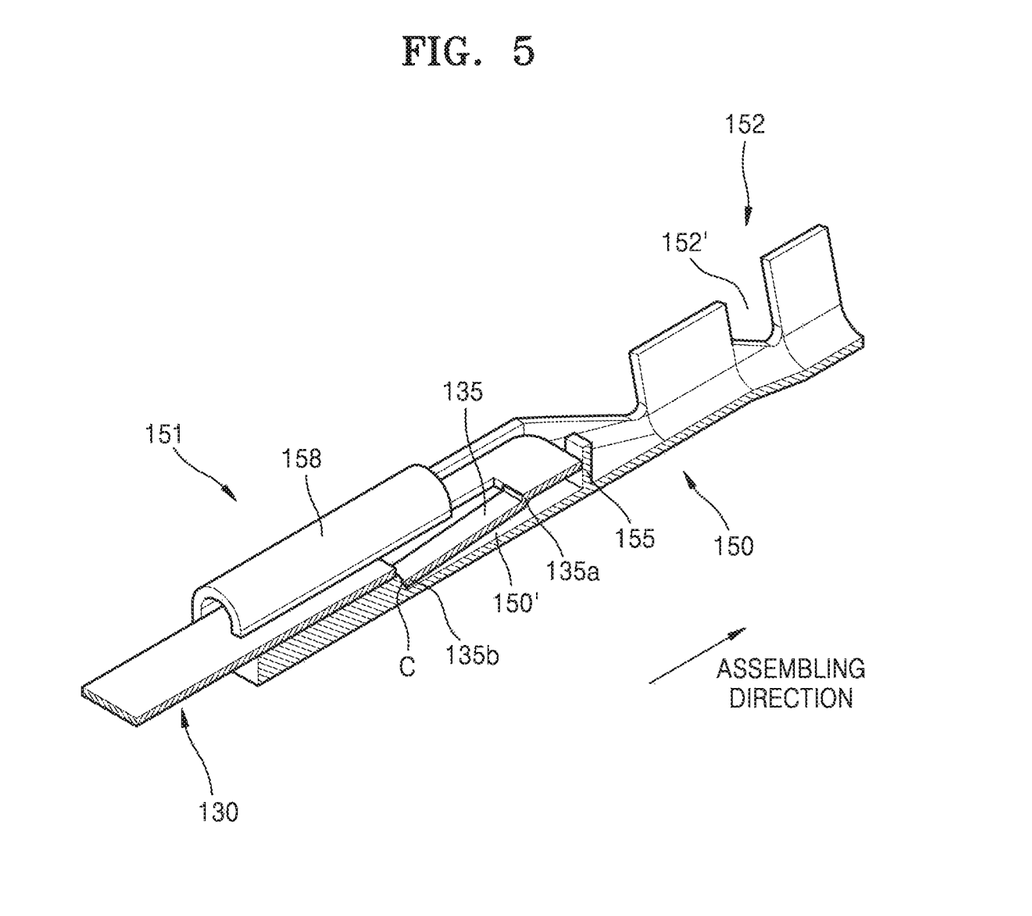
FIG. 5 is a partial perspective view showing the lead portion assembled with the lock member of FIG. 2, for describing assembly of the lead portion with the lock member.
Figure 6:
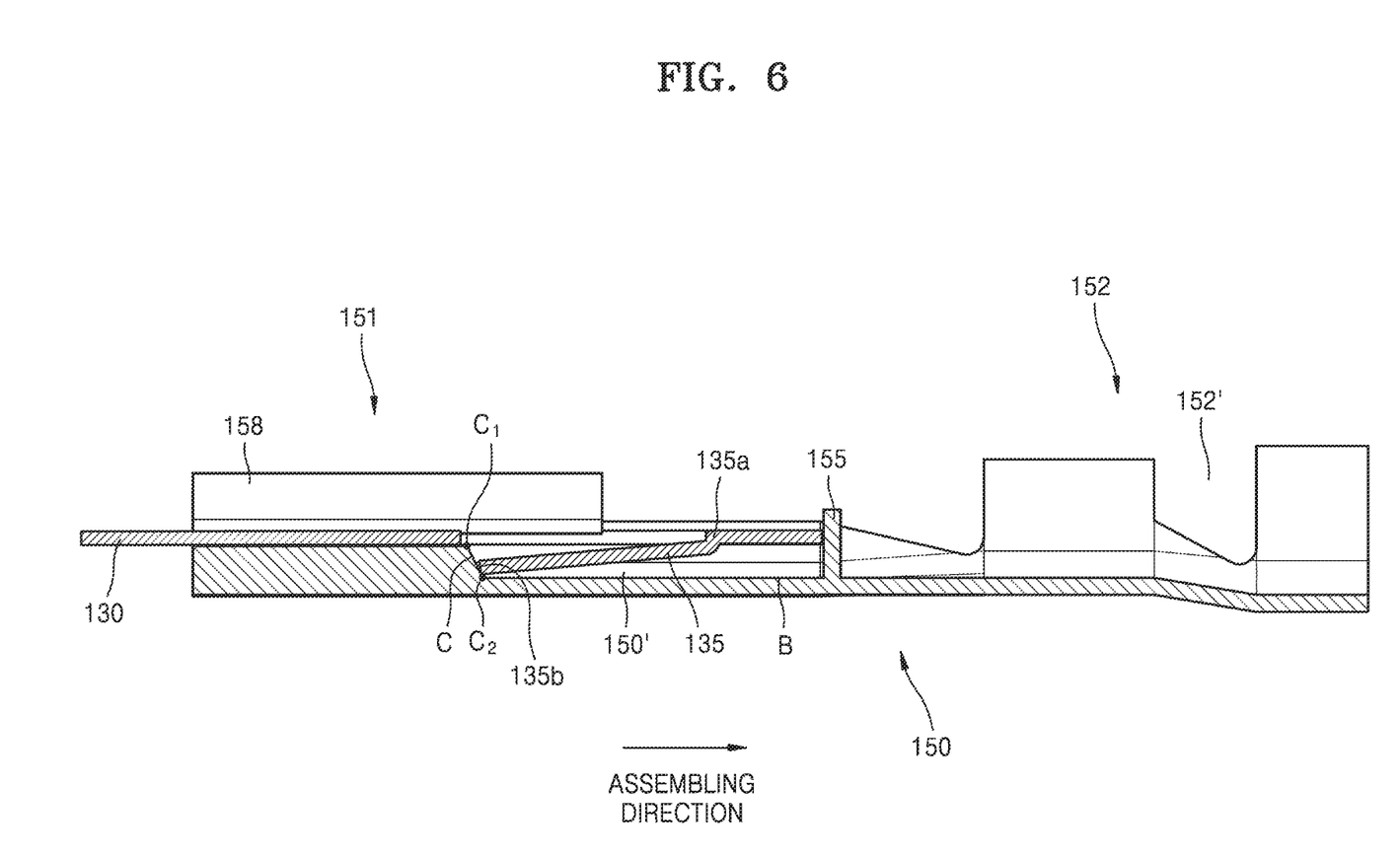
FIG. 6 is a cross-sectional view showing assembly of a lead portion with a lock member.
Figure 7:
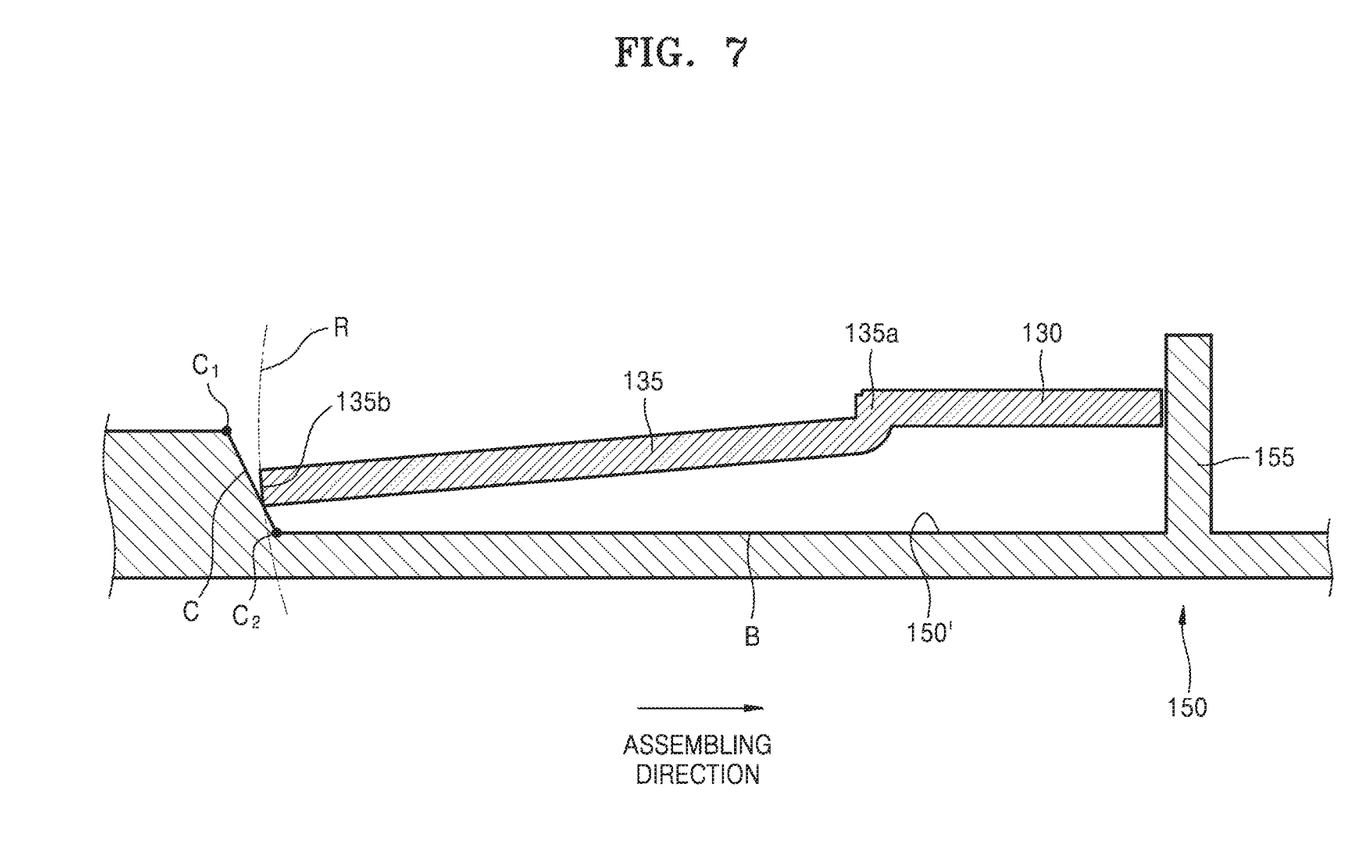
FIG. 7 is an enlarged view of a portion of FIG. 6.

FIG. 2 is a perspective view showing assembly of the lead portion 130 with the lock member 150. FIGS. 3 to 5 are drawings for illustrating assembly of the lead portion 130 with the lock member 150 of FIG. 2, FIG. 3 is a perspective view showing the lead portion 130 and the lock member 150 when separated, FIG. 4 is a plan view showing the lead portion 130 and the lock member 150 when separated, and FIG. 5 is a partial perspective view showing assembly of the lead portion 130 with the lock member 150. In addition, FIG. 6 is a cross-sectional view showing assembly of the lead portion 130 with the lock member 150. FIG. 7 is an enlarged view of a portion of FIG. 6.

As a reference, in the above drawings, the lead portion 130 in the lead member 140 is only shown, and hereinafter, descriptions will be provided based on the lead portion 130. However, technical details about the lead portion 130 that will be described below may be appreciated as the technical details of the lead member 140 including the lead portion 130.

Referring to the drawings, the lock member 150, in particular, the lead lock portion 151 may include a guide rail 158 to which the lead portion 130 is inserted. The guide rail 158 may include a pair of guide rails 158 that are arranged facing each other in a width direction of the lead portion 130 so as to surround opposite edges of the lead portion 130. For example, the guide rail 158 may protrude upward from a main surface of the lock member 150, and may be integrally bent to surround the opposite edges of the lead portion 130.

The lock member 150 may include a groove portion 150' to overlap with the guide rails 158. With respect to a relative location between the guide rail 158 and the groove portion 150', the guide rail 158 may extend across a contact surface C of the groove portion 150' along an assembling direction. The contact surface C of the groove portion 150' will be described in detail later. The guide rail 158 may firmly fix the location of the lead portion 130 while surrounding the opposite edges of the lead portion 130. The opposite edges of the lead portion 130 in a width direction thereof may be surrounded by the guide rails 158, and a pressing portion 135 may be provided at a center in the width direction of the lead portion 130. As described later, when the pressing portion 135 of the lead portion 130 is in contact with the contact surface C of the groove portion 150', the edges at opposite sides of the pressing portion 135 may be surrounded by the guide rails 158 so as to be fixed.

The lock member 150 may include the lead lock portion 151, to which the lead portion 130 is coupled, at an end thereof, and the wiring lock portion 152 at another end opposite to the lead lock portion 151. The wiring lock portion 152 may be directly connected to the circuit unit 50 or may be connected to the wiring 51 connected to the circuit unit 50. The wiring lock portion 152 may include a protrusion that protrudes upward vertically from the main surface of the lock member 150. The protrusion may be directly inserted to the circuit unit 50, or the wiring 51 connected to the circuit unit 50 may be inserted to a groove portion 152' of the protrusion.

According to an embodiment of the present disclosure, the protrusion of the wiring lock portion 152 may include the groove portion 152', to which the wiring 51 is inserted, but in another embodiment of the present disclosure, the protrusion of the wiring lock portion 152 may be directly inserted to the circuit unit 50, and in this case, the groove portion 152' may be omitted.

The lead portion 130 may be assembled with the lock member 150 in a sliding type. Throughout the specification, the assembling direction of the lead portion 130 may denote a direction in which the lead portion 130 is inserted to the lock member 150.

The lock member 150 (in more detail, the lead lock portion 151) may include a stopper 155 protruding upward along an up-down direction that is different from the assembling direction and the groove portion 150' recessed downward, at different positions along the assembling direction of the lead portion 130. The groove portion 150' may be defined by a stopper 155 and the contact surface C that are respectively provided at a front and a rear positions in the assembling direction of the lead portion 130. For example, the groove portion 150' may have an end defined by the stopper 155 and an opposite end defined by the contact surface C. However, according to another embodiment, an end of the groove portion 150' may be defined at different location from that of the stopper 155, and the groove portion 150' may have an end at a separate location from the stopper 155 and an opposite end defined by the contact surface C. For example, the stopper 155 and the contact surface C may be respectively provided at a front and a rear positions along the assembling direction of the lead portion 130.

The stopper 155 and the contact surface C may perform a function of fixing the lead portion 130 at a right position at the front and rear positions of the lock member 150. The stopper 155 may function as a hooking step for preventing the lead portion 130 from moving frontward any further, and the contact surface C pressurizes the lead portion 130 frontward, that is, in the assembling direction, to maintain contact of an end portion of the lead portion 130 at the stopper 155. Fixing of the position of the lead portion 130 via the stopper 155 and the contact surface C will be described in more detail below.

The stopper 155 may protrude upward from the main surface of the lock member 150 to regulate an assembling location of the lead portion 130. The lead portion 130 may be inserted as sliding into the lock member 150, and at this time, the sliding of the lead portion 130 is restricted by the stopper 155 to define the assembling location of the lead portion 130. That is, the stopper 155 defines an assembling limit at which the lead portion 130 is not pushed any further to determine the right position of the lead portion 130. That is, the right position of the lead portion 130 may denote a location where the end portion of the lead portion 130 abuts on the stopper 155. The end portion of the lead portion 130 may maintain at a location of abutting on the stopper 155, and this may denote that the lead portion 130 and the stopper 155 may not be shaken or moved relative to each other.

For example, when the lead portion 130 and the lock member 150 are shaken or moved relative to each other, a resistance of the signal transfer path formed by the lead portion 130 and the lock member 150 changes, and a measurement error of a voltage signal may be caused. For example, when the signal transfer paths from the plurality of battery cells 10 have identical resistances, a voltage signal transferred through each of the signal transfer paths may be reliable. Unlike the above, when the lead portion 130 and the lock member 150 are moved relative to each other, the resistance of each signal transfer path frequently changes and each signal transfer path may have a different resistance from those of the other signal transfer paths. Accordingly, voltage information obtained through each signal transfer path has a measurement error. Cell balancing performed based on the voltage signal having the measurement error may not address deviation in charging and discharging states among the battery cells 10 or may interfere with normal charging and discharging operations.

According to an embodiment, since the lead portion 130 and the lock member 150 are fixed at right positions thereof, and accordingly, the signal transfer paths from different battery cells 10 have uniform resistances, and a measurement error of the voltage signal does not occur.

The lead portion 130 may be pressed in the assembling direction, and accordingly, the end portion of the lead portion 130 is in contact with the stopper 155. Here, the lead portion 130 may be pressed by the pressing portion 135 provided in the lead portion 130.

The pressing portion 135 may include an end 135a connected to a main body of the lead portion 130 and an opposite end 135b contacting the contact surface C of the lock member 150. The pressing portion 135 may be in an elastically compressed state, and may provide an elastic recovery force to the end 135a and the opposite end 135b. That is, the pressing portion 135 may apply an elastic recovery force of pushing the lead portion 130 in the assembling direction with respect to the contact surface C of the lock member 150, and accordingly, the position of the lead portion 130 may be fixed in a state of contacting the stopper 155 that defines the assembling limit. The pressing portion 135 may maintain its elastically deformed state between the end 135a and the opposite end 135b, and accordingly, may provide the elastic recovery force. That is, the pressing portion 135 may include a plate spring that is compressed in a lengthwise direction within an elastic region.

The pressing portion 135 may pressed downwards to the groove portion 150' from the main body of the lead portion 130. As the lead portion 130 slides, the pressing portion 135 and the groove portion 150' are adjacent to each other at a location where the pressing portion 135 and the groove portion 150' face each other, and the pressing portion 135 pressed towards the groove portion 150' naturally enters the groove portion 150'. Here, the pressing portion 135 is pressed downward, that is, towards the groove portion 150', and may be forcedly in physical contact with the contact surface C of the groove portion 150'.

The groove portion 150' includes the contact surface C that is in contact with the pressing portion 135. In the present disclosure, the contact surface C may be gradually inclined in the assembling direction towards a lower portion thereof.

That is, the contact surface C may be inclined towards the assembling direction in order to push the pressing portion 135 to the assembling direction. After the pressing portion 135 enters the groove portion 150', the pressing portion 135 may be pressed towards the assembling direction, in contact with the contact surface C of the groove portion 150'. That is, in a state where the lead portion 130 is restricted to move in the assembling direction by the stopper 155, the contact surface C provides an elastic force for pushing the pressing portion 135 in the assembling direction while maintaining an elastic contact with the pressing portion 135, and accordingly, the lead portion 130 including the pressing portion 135 may maintain at the right position, that is, is in contact with the stopper 155.

In an embodiment of the present disclosure, the contact surface C is inclined in the assembling direction towards the lower portion thereof. The contact surface C may include a linear inclined surface. However, according to another embodiment, the contact surface C may have a curved inclined surface.

The right position of the lead portion 130 denotes a state in which the end portion of the lead portion 130 is in contact with the stopper 155 and the pressing portion 135 is in contact with the contact surface C. That is, at the right position of the lead portion 130, the pressing portion 135 enters the groove portion 150' to be in contact with the contact surface C of the groove portion 150'.

Referring to FIGS. 6 and 7, in order for the pressing portion 135 to enter the groove portion 150', a distant boundary C1 of the contact surface C may be located, based on the stopper 155, far beyond a rotating radius (R, corresponding to a length of the pressing portion 135) of the pressing portion 135. When the distant boundary C1 of the contact surface C is located inside the rotating radius R of the pressing portion 135, the pressing portion 135 may not enter the groove portion 150' and accordingly the pressing portion 135 may not contact the contact surface C of the groove portion 150'.

When the pressing portion 135 is in contact with the contact surface C of the groove portion 150', it denotes that the pressing portion 135 is in contact with the contact surface C as being pressed by a predetermined pressure. To do this, based on the stopper 155, a nearby boundary C2 of the contact surface C may be arranged inside the rotating radius R (corresponding to the length of the pressing portion 135) of the pressing portion 135. For example, when the nearby boundary C2 of the contact surface C is located beyond the rotating radius R of the pressing portion 135, the pressing portion 135 may not be in contact with the contact surface C. For example, a bottom surface B of the groove portion 150' is a flat surface, unlike the contact surface C that is inclined in the assembling direction, and thus, even when the pressing portion 135 abuts on the bottom surface B, pressing in the assembling direction may not be expected like in the contact surface C.

The rotating radius R of the pressing portion 135 may substantially correspond to the length of the pressing portion 135. That is, the pressing portion 135 enters the groove portion 150' while rotating downward with respect to the main body of the lead portion 130, and then, contacts the contact surface C. Therefore, in a condition for the pressing portion 135 to enter the groove portion 150' or to contact the contact surface C, what matters is whether the distant boundary C1 or the nearby boundary C2 of the contact surface C is located beyond the rotating radius R of the pressing portion 135 or located inside the rotating radius R of the pressing portion 135. The distant boundary C1 of the contact surface C may correspond to a location where the groove portion 150' starts along the assembling direction of the lead portion 130.

When the lead portion 130 slides to be assembled with the lock member 150, the pressing portion 135 of the lead portion 130 may approach a location facing the groove portion 150' of the lock member 150. The pressing portion 135 may have the rotating radius R about the end 135a connected to the main body of the lead portion 130, and may enter the groove portion 150' when the opposite end 135b of the pressing portion 135 rotates downward. Here, in order for the opposite end 135b of the pressing portion 135 to smoothly enter the groove portion 150', an external boundary of the groove portion 150', that is, the distant boundary C1 may be located far beyond the rotating radius R formed by the opposite end 135b of the pressing portion 135. When the distant boundary C1 of the contact surface C is located inside the rotating radius R formed by the opposite end 135b of the pressing portion 135, the opposite end 135b of the pressing portion 135 may not enter the groove portion 150', and accordingly, the opposite end 135b of the pressing portion 135 may not be in contact with the contact surface C.

The opposite end 135b of the pressing portion 135 that once entered the groove portion 150' may be in contact with the contact surface C while rotating downward along the rotating radius R. That is, in the groove portion 150', the opposite end 135b of the pressing portion 135 may contact the contact surface C while tracing the rotating radius R. Here, based on the stopper 155, the nearby boundary C2 that is the closest in the contact surface C may be located inside the rotating radius R of the pressing portion 135. When the nearby boundary C2 of the contact surface C is located far beyond the rotating radius R of the pressing portion 135, the contact surface C may not be in contact with the pressing portion 135. Here, even when the bottom surface B of the groove portion 150' contacts the pressing portion 135, the bottom surface B that is flat, unlike the contact surface C that is inclined towards the assembling direction, may not pressurize the pressing portion 135 in the assembling direction.

In the present specification, the distant boundary C1 and the nearby boundary C2 of the contact surface C may respectively correspond to a farthest location and a closest location in the contact surface C from the stopper 155. For example, the nearby boundary C2 corresponds to the closest location in the contact surface C to the stopper 155, and the distant boundary C1 may correspond to the farthest location in the contact surface C from the stopper 155.

When the opposite end 135b of the pressing portion 135 rotates downwards about the end 135a connected to the main body of the lead portion 130 along the rotating radius R, a condition for the opposite end 135b of the pressing portion 135 to smoothly enter the groove portion 150' and to be in contact with the contact surface C in the groove portion 150' may include that the distant boundary C1 is located far beyond the rotating radius R and the nearby boundary C2 is located inside the rotating radius R, compared with the rotating radius R of the pressing portion 135. Throughout the present specification, relative distances between the rotating radius R and the distant boundary C1 and the nearby boundary C2 may be appreciated based on one reference point, e.g., the stopper 155.

The contact surface C has the distant boundary C1 and the nearby boundary C2 based on the stopper 155, and may include an inclined surface linearly connecting the distant boundary C1 and the nearby boundary C2. However, according to an embodiment, the contact surface C may be a curved surface connecting the distant boundary C1 and the nearby boundary C2 to each other. Here, the contact surface C may form a concave or a convex surface between the distant boundary C1 and the nearby boundary C2.

While the present disclosure has been particularly shown and described with reference to exemplary embodiments thereof, it will be understood by those of ordinary skill in the art that various changes in form and details may be made therein without departing from the spirit and scope as defined by the following claims. Therefore, the scope sought to be protected of the present disclosure shall be defined by the appended claims.

INDUSTRIAL APPLICABILITY

The present disclosure may be applied to a battery as an energy source that may be rechargeable and dischargeable and various appliances using the battery as a driving power.

The invention claimed is:

1. A battery pack comprising a battery cell, a circuit unit, a lock member, and a lead member, the lock member and the lead member being assembled with each other to form a signal transfer path between the battery cell and the circuit unit,
wherein the lock member comprises a stopper protruding upward in an up-down direction that is different from an assembling direction of the lead member, and a groove portion depressed downward, the stopper and the groove portion being provided at different locations from each other along the assembling direction of the lead member, and
the lead member comprises an end portion contacting the stopper and a pressing portion contacting the groove portion.

2. The battery pack of claim 1, wherein
the pressing portion is pressed downward from a main body of the lead member toward the groove portion.

3. The battery pack of claim 2, wherein
the pressing portion has a radius of rotation about an end connected to the main body of the lead member and is pressed against the groove portion while rotating downward.

4. The battery pack of claim 3, wherein
the groove portion has a contact surface that is inclined in the assembling direction toward a lower portion thereof.

5. The battery pack of claim 4, wherein
the pressing portion is compressed between the end connected to the main body of the lead member and an opposite end contacting the contact surface of the groove portion to provide an elastic recovery force for pushing the lead member in the assembling direction.

6. The battery pack of claim 5, wherein
the lead member is restricted from proceeding in the assembling direction by being in contact with the stopper.

7. The battery pack of claim 6, wherein
the stopper and the contact surface of the groove portion are respectively arranged at a front location and a rear location along the assembling direction of the lead member.

8. The battery pack of claim 1, wherein
the lock member includes a guide rail for guiding assembly of the lead member.

9. The battery pack of claim 8, wherein
the guide rail comprises a pair of guide rails provided at opposite sides of the lead member in a width direction of the lead member to surround opposite edges of the lead member.

10. The battery pack of claim 8, wherein
the guide rail is configured to extend across a contact surface of the groove portion along the assembling direction of the lead member.

11. The battery pack of claim 1, wherein
the groove portion comprises an inclined contact surface including a distant boundary and a nearby boundary with respect to the stopper.

12. The battery pack of claim 11, wherein
the distant boundary is located beyond a radius of rotation of the pressing portion to be relatively far from the stopper.

13. The battery pack of claim 11, wherein
the nearby boundary is located inside a radius of rotation of the pressing portion to be relatively close to the stopper.

14. The battery pack of claim 1, wherein
the lead member comprises a lead portion coupled to the lock member and a connector connected to an electrode of the battery cell.

15. The battery pack of claim 14, wherein
at least two battery cells are connected to the connector of the lead member.

16. The battery pack of claim 1, wherein
the lock member comprises a lead lock portion coupled to the lead member and a wiring lock portion to which wiring connected to the circuit unit is connected.

17. The battery pack of claim 16, wherein
the wiring lock portion comprises a groove into which the wiring is inserted.

18. The battery pack of claim 1, wherein
the lock member and the lead member form a path for transferring a signal regarding voltage information of the battery cell, and
the circuit unit is configured to perform cell balancing based on a voltage signal of the battery cell.

* * * * *